United States Patent Office 3,470,149
Patented Sept. 30, 1969

3,470,149
ALKYL GLYCOSIDES DERIVED FROM GENTAMICIN
David J. Cooper, West Caldwell, N.J., assignor to Schering Corporation, Bloomfield, N.J., a corporation of New Jersey
No Drawing. Filed July 28, 1967, Ser. No. 656,660
Int. Cl. C07d 87/32; A01n 9/28
U.S. Cl. 260—210
5 Claims

ABSTRACT OF THE DISCLOSURE

Novel 3-deoxy-3-methylamino-4-methylpentose, and certain derivatives thereof, having the structural formula:

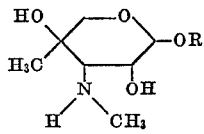

wherein R is hydrogen or saturated hydrocarbyl radicals. These compounds may be prepared from the antibiotic gentamicin and can be used to form amine fluosilicate salts useful as moth-proofing agents.

---

This invention relates to novel derivatives of gentamicin and to processes for the preparation and use thereof.

Gentamicin is an antibiotic containing several co-produced fractions obtained as an elaboration product of a gentamicin producing species of the genus Micromonospora of the order Actinomycetales, eg. Micromonospora purpurea n. sp. and Micromonospora echinospora n. sp., and mutants thereof. Methods for the production, recovery and preparation of gentamicin are described in U.S. Patent No. 3,091,572.

It has been found according to this invention that certain novel compounds are obtained by direct alcoholysis of gentamicin, and that certain other novel compounds are obtained by the hydrolysis of the so-produced glycosides. The novel compounds of this invention, therefore, are represented by the following structural formula:

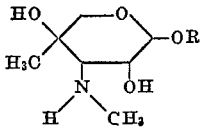

wherein R is a member of the group consisting of hydrogen and lower alkyl, said lower alkyl having up to eight carbon atoms, and includes such straight and branched chain radicals such as methyl, ethyl, propyl, isopropyl, n-butyl, pentyl, hexyl and the like.

The free base compounds of Formula I can be reacted with fluosilicic acid to form fluosilicate salts in accordance with U.S. Patents Nos. 1,915,334 and 2,075,359. The amine fluosilicate salts thus obtained are effective as moth-proofing agents. When used as a moth-proofing agent, the compounds of this invention may be dissolved in a suitable solvent and sprayed onto the appropriate surface sought to be protected. The free base compounds also form salts with thiocyanic acid, which salts can be condensed with formaldehyde in accordance with U.S. Patents Nos. 2,425,320 and 2,606,155 to form amine thiocyanateformaldehyde condensation products for use as pickling inhibitors.

The novel glycosides of this invention, i.e., those compounds of Formula I wherein R represents an alkyl radical, may be prepared from gentamicin by subjecting gentamicin to alcoholysis. A suitable alcoholysis technique includes the refluxing of the gentamicin in the appropriate alcohol saturated with hydrogen chloride. For example, methanolysis of gentamicin in refluxing methanol, saturated with dry hydrogen chloride, produces the desired methyl glycoside, whereas ethanolysis of gentamicin refluxing ethanol, saturated with dry hydrogen chloride, produces the desired ethyl glycoside. Similarly, other alkyl glycosides, may be produced by refluxing gentamicin in the appropriate hydrogen chloride-saturated alcohol, said alkyl glycoside corresponding to the alcohol employed. The so-produced alkyl glycosides may be isolated by the usual and well known techniques of isolation such as counter-current distribution procedures or partition chromatography. In a preferred method of isolation the alkyl glycoside is isolated by partition chromatography, such as in the instance wherein the glycoside was isolated from the methanolysis mixture by chromatography on silica gel using the lower phase of the system methanol-chloroform-17% ammonium hydroxide (1:2:1) as eluent. The so-produced and so-isolated alkyl glycosides may very conveniently be characterized from their N-acetyl derivatives which are readily prepared by standard acetylation techniques such as by reacting the glycoside with acetic anhydride. In a preferred method the glycoside is merely contacted with excess quantities of acetic anhydride in an alcoholic solvent, preferably methanol followed by rapid removal of the excess acetic anhydride. The N-acetyl glycosides may be deacetylated by heating the N-acetate in refluxing hydrazine hydrate.

The novel alkyl glycosides on acidic hydrolysis, such as by heating the glycoside with hydrochloric acid, preferably at 100° C. for about 4 hours, permits substantial conversion of the alkyl glycoside to the desired pentose.

The following examples illustrate the preparation of the compounds of Formula I and, although such examples are specifically directed to a few members of the class, the procedures are, nevertheless, generally applicable.

PREPARATION OF ALKYL GLYCOSIDES

Example I.—Preparation of methyl 3-deoxy-3-methylamino-4-methyl-pentopyranoside

Suspend 1.0 g. of gentamicin in 50 ml. of methanol previously saturated with dry hydrogen chloride and reflux the resulting mixture for 30 minutes. Evaporate to dryness in vacuo. Suspend the residue in 50 ml. of chloroform and saturate the suspension with dry ammonia gas. Filter off the suspension of ammonium chloride and evaporate the solution to dryness. Chromatograph the residue on a column of silica gel using the lower phase of the system chloroform-methanol-17% ammonium hydroxide (2:1:1 v./v.) as developer-eluent to give an anomeric mixture of methyl 3-deoxy-3-methylamino-4-methyl-pentopyranoside as a pale yellow syrup.

In a similar manner by substituting the methanol in this example with other alcohols, the corresponding alkyl 3-deoxy-methylamino-4-methyl-pentopyranoside is produced.

Although the foregoing preparation illustrates the preparation of the alkyl glycosides of this invention from gentamicin, an antibiotic complex composed of three separate but structurally and biologically related chemical entities, the same alkyl glycosides are also preparable from each of the individual components of such complex. The individual components of gentamicin may be separated by standard partition chromatographic techniques such as eluting a gentamicin-packed cellulose absorbent with the lower phase of a solvent system composed of chloroform-methanol-17% ammonium hydroxide (2:1:1 v./v.).

CHARACTERIZATION OF ALKYL GLYCOSIDES

Example II.—Preparation of methyl-3-deoxy-3-(N-acetylmethylamino)-4-methyl-pentopyranoside Dissolve 1 g. of methyl 3-deoxy-3-methylamino-4-methyl-pentopyranoside in 20 ml. of methanol and add 0.5 ml. of acetic anhydride. Immediately thereafter evaporate off the methanol at 50° C. in vacuo, add 50 ml. of methanol and again evaporate in vacuo. Repeat the addition and evaporation of 50 ml. portions of methanol until all excess acetic anhydride is removed. Recrystallize the residue from absolute ethanol to give colorless crystals of a single anomer of methyl 3-deoxy-3-(N-acetylmethylamino)-4-methyl-pentopyranoside, M.P. 190–194°, $[\alpha]_D^{25} = +184°$ (1% in methanol), molecular weight (ebullioscopic in methanol) 226, analyzing correctly for the expected formula $C_{10}H_{19}NO_5$ (mol. wt. 233), as follows: C, 5.11; H, 8.37; N, 5.85%.

Similarly, other alkyl glycosides may be subjected to N-acetylation as in the foregoing example and the resulting acetylation product may similarly be so characterized.

HYDROLYSIS OF ALKYL 3-DEOXY-3-METHYL-AMINO-4-METHYL-PENTOPYRANOSIDE

Example III.—Preparation of 3-deoxy-3-methylamino-4-methyl-pentose

Dissolve 1.0 g. of methyl-3-deoxy-3-methylamino-4-methyl-pentopyranoside in 50 ml. of 2 N hydrochloric acid and heat at 100° for 4 hours. Pass the solution through a strongly basic ion exchanger (to remove the hydrochloric acid) and freeze-dry to obtain 3-deoxy-3-methylamino-4-methyl-pentose.

I claim:
1. A compound having the structural formula:

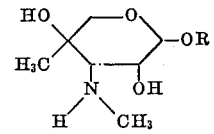

wherein R is a member of the group consisting of hydrogen and lower alkyl.

2. A compound of claim 1 wherein R is hydrogen.
3. A compound of claim 1 wherein R is lower alkyl.
4. A compound of claim 3 wherein R is methyl, said compound being methyl 3-deoxy-3-methylamino-4-methyl-pentopyranoside.
5. A compound of claim 2 wherein R is hydrogen, said compound being 3-deoxy-3-methylamino-4-methyl-pentose.

References Cited
UNITED STATES PATENTS 3,091,572  5/1963  Luedemann et al.

OTHER REFERENCES

Jour. Amer. Chem. Soc., vol. 79, No. 18, September 1957, pp. 5076–5077.

LEWIS GOTTS, Primary Examiner

JOHNNIE R. BROWN, Assistant Examiner

U.S. Cl. X.R.
260—211, 999